US 6,168,192 B1

(12) United States Patent
Bauer

(10) Patent No.: US 6,168,192 B1
(45) Date of Patent: Jan. 2, 2001

(54) COMBINED SEAT-INTEGRAL AIRBAG FOR THE HEAD AND THORAX

(75) Inventor: Wolfgang Bauer, Germering (DE)

(73) Assignee: Autoliv Development AB(SE)

( * ) Notice: Under 35 U.S.C. 154(b), the term of this patent shall be extended for 0 days.

(21) Appl. No.: 09/355,908

(22) PCT Filed: Jan. 31, 1998

(86) PCT No.: PCT/EP98/00512

§ 371 Date: Aug. 5, 1999

§ 102(e) Date: Aug. 5, 1999

(87) PCT Pub. No.: WO98/34815

PCT Pub. Date: Aug. 13, 1998

(30) Foreign Application Priority Data

Feb. 5, 1997 (DE) ............................................. 197 04 290

(51) Int. Cl.$^7$ ............................ B60R 21/22; B60R 21/08
(52) U.S. Cl. ................................. 280/730.2; 297/216.13
(58) Field of Search ..................... 280/730.2; 297/216.13

(56) References Cited

U.S. PATENT DOCUMENTS

| 3,836,168 | * | 9/1974 | Nonaka et al. | 297/216.13 |
| 5,112,079 | * | 5/1992 | Haland et al. | 280/730.2 |
| 5,556,127 | | 9/1996 | Hurford et al. . | |
| 5,826,938 | * | 10/1998 | Yanase et al. | 297/216.3 |
| 5,833,312 | * | 11/1998 | Lenz | 297/216.13 |
| 5,890,733 | * | 4/1999 | Dillon | 280/730.2 |
| 5,924,724 | * | 7/1999 | Nakamura et al. | 280/730.2 |
| 5,944,341 | * | 8/1999 | Kimura et al. | 280/730.2 |
| 5,992,878 | * | 11/1999 | Narita et al. | 280/730.2 |
| 6,019,387 | * | 1/2000 | Jost | 280/730.2 |
| 6,045,182 | * | 4/2000 | Chevallier et al. | 297/216.13 |
| 6,059,311 | * | 5/2000 | Wipasuramonton et al. | 280/730.2 |
| 6,062,593 | * | 5/2000 | Satani et al. | 280/730.2 |

FOREIGN PATENT DOCUMENTS

| 40 18 470 | 12/1990 | (DE) . |
| 197 00 507 | 7/1997 | (DE) . |
| 2 305 638 | 4/1997 | (GB) . |
| 96/22904 | 8/1996 | (WO) . |

* cited by examiner

Primary Examiner—Lanna Mai
Assistant Examiner—Hau Phan
(74) Attorney, Agent, or Firm—Robert W. Becker & Associates

(57) ABSTRACT

A vehicle seat has a seat frame having a pivot connection and a seat portion mounted on the seat frame. A backrest, having a head rest, is mounted on the seat frame such that the backrest is pivotable relative to the seat portion about the pivot connection. A lateral airbag system is mounted in the backrest and extends in a longitudinal direction of the backrest. The lateral airbag system has an elongate housing open at one side. The elongate housing has an elongate channel extending along a side of the backrest to an upper end of the head rest. The elongate housing is connected to the seat frame. The lateral airbag system has an airbag folded into the elongate channel such that a direction of folding is perpendicular to a longitudinal direction of the elongate channel and such that the airbag is completely stretched out in the longitudinal direction. A cover covering the open side of the elongate housing is provided. The cover is adapted to open upon actuation of the airbag to release the airbag.

9 Claims, 2 Drawing Sheets

COMBINED SEAT-INTEGRAL AIRBAG FOR THE HEAD AND THORAX

BACKGROUND OF THE INVENTION

The invention relates to a vehicle seat with lateral air bag system whereby the folded elongate air bag for head and thorax is arranged in the backrest of the vehicle seat in its longitudinal direction and is covered by a cover that upon the actuation of the air bag opens, for example, embodied in the form of an upholstery cover that rips, an openable cover cap etc.

A vehicle seat with the aforementioned features is disclosed in DE 40 18 470 A1. The folded air bag is arranged in a storage compartment extending laterally in the longitudinal direction of the backrest of the vehicle seat and formed in the backrest. This storage compartment with airbag arranged therein is covered by the cover of the vehicle seat so that upon actuation the inflating air bag will rip apart or split the cover. The type of folding of the air bag and the storage of the air bag are not disclosed in DE 40 18 470 A1.

The invention has the disadvantage that the mounting of the folded air bag in the storage compartment of the backrest and closing of the seat cover fabric as a cover for the storage compartment is difficult.

It is an object of the invention to ensure for a vehicle seat with the aforementioned features, while providing a simple mounting, a safety-compliant, optimal, and fast unfolding of the air bag.

SUMMARY OF THE INVENTION

The solution to this object results with advantageous embodiments and further developments of the invention from the following description.

The invention is based on the basic idea that a housing in the form of a profiled rail is provided at the vehicle seat which profiled rail is open in the unfolding direction of the air bag whereby the air bag is folded exclusively in a plane perpendicular to the longitudinal extension of the profiled channel and is connected to the vehicle frame. The profiled rail with the profiled channel extends past to the backrest into the area of the headrest provided at the vehicle seat so that the folded air bag stretches out completely within the profiled channel.

The invention has the advantage that the profiled rail open in the unfolding direction provides a guide for the air bag for its unfolding and thus determines the direction of unfolding and stabilizes this process. The profiled channel has the same length as the stretched out, elongate air bag so that the air bag in the longitudinal direction is completely stretched and no folds are required for the upper and lower end portion of the air bag transverse to the longitudinal extension of the profiled channel. Because of the presence of the profiled rail, mounting of the folded air bag at the vehicle seat, respectively, within the backrest is simplified because the profiled channel receiving the air bag provides a defined receiving chamber and, at the same time, protects the folded air bag.

Due to the stretched arrangement of the air bag folded only in a plane parallel to the longitudinal extension of the profiled channel, a very fast and uniform unfolding action over the entire length is provided whereby, especially upon side impact, a quick release is desirable because only a few milliseconds are available for complete unfolding of the air bag. Since the profile rail extends past the backrest into the area of the headrest provided at the vehicle seat, the advantage of protecting the upper body also in the head area of the buckled up passenger is provided because of the profiled rail extending into the headrest whereby, especially in the head area, the guided unfolding of the air bag is of particular importance.

According to one embodiment of the invention, it is suggested that the profiled rail at both ends of its longitudinal extension is closed in the unfolding direction of the air bag so that it is ensured that the air bag can unfold only in the direction of the upper body of the passenger and cannot unfold in the upper or downward direction, relative to the vehicle seat.

According to one embodiment of the invention, it is suggested that the profiled rail is an integral component of the vehicle frame. However, it can also be provided to embody the profiled rail as a separate component for retrofitting the seat frame whereby this has the advantage of allowing pre-assembly of the air bag in the profiled rail.

It may be provided that the profiled rail extending along the backrest of the vehicle seat is provided with a portion that projects past the pivot point of the backrest at the seat frame. As an alternative, an embodiment of the profiled rail is possible in which the profiled rail extending along the backrest has an angled portion projecting past the pivot point of the backrest relative to the seat portion.

For simplifying the assembly, it may be provided that the air bag is a component of a module that is to be mounted in the profiled rail.

In an alternative embodiment of the invention, with respect to inflation of the air bag, it may be suggested that either the air bag folded into the profiled rail is provided with a gas inlet opening extending over the length of the profiled rail or that the air bag folded into the profiled rail has distributed over the length of the profiled rail a plurality of gas inlet openings.

BRIEF DESCRIPTION OF THE DRAWINGS

The drawing shows an embodiment of the invention which will be explained in the following. It is shown in.

DESCRIPTION OF PREFERRED EMBODIMENTS

Figure 1:
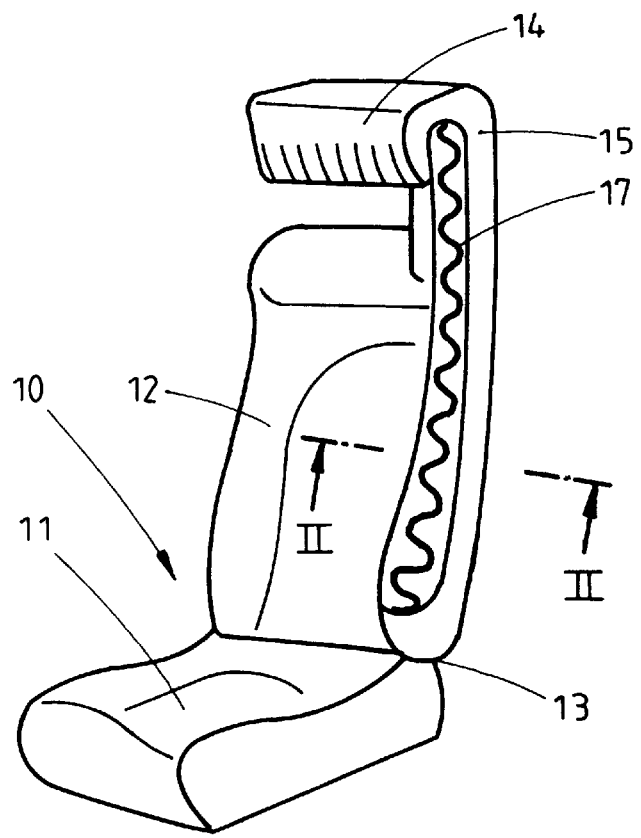
FIG. 1 a vehicle seat in a perspective view.
Figure 2:
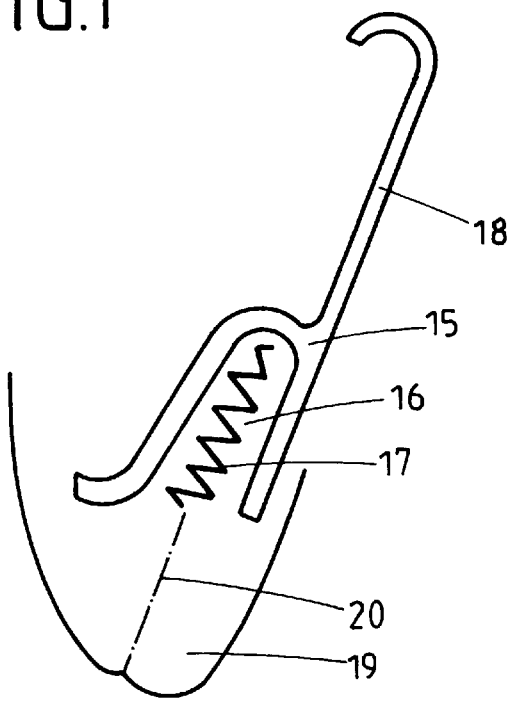
FIG. 2 the profiled rail arranged laterally at the seat in a plan view onto the section line II—II of FIG. 1.

The vehicle seat 10 has a seat portion 11 and a backrest 12 which can be adjusted relative to the seat portion 11 about pivot point 13. At the upper end of the backrest 12, a headrest 14 is arranged.

The backrest 12 of the vehicle seat 10 is provided laterally, respectively at the outer side of the vehicle seat 10 when viewed in the driving direction of the vehicle, with a profiled rail 15 preferably within the upholstery portion providing lateral support for the buckled-in person in the vehicle seat 10. The profiled rail extends in the longitudinal direction of the backrest 12. The profiled rail has a profiled channel 16 which in the direction substantially parallel to the upper body of a person seated in the vehicle seat (not represented in the drawing), respectively, parallel to the backrest and the seat portion 11, is open.

An air bag, indicated by reference numeral 17, is positioned in the profiled channel 16 of the profiled rail 15 which is folded in a plane perpendicular to the profiled channel 16 whereby the opening of the profiled channel 16 with air bag 17 folded therein is covered by the upholstery 19 of the vehicle seat 10 and is thus closed. The reference numeral 20 indicates a pre-defined rip line along which the upholstery 19 will be ripped open by the air bag 17 upon actuation and inflation to allow it to exit from the profiled channel 16.

The profiled rail 15 is connected by a fastening projection 18 to the vehicle frame, respectively, is an integral component of the seat frame.

Figure 3:
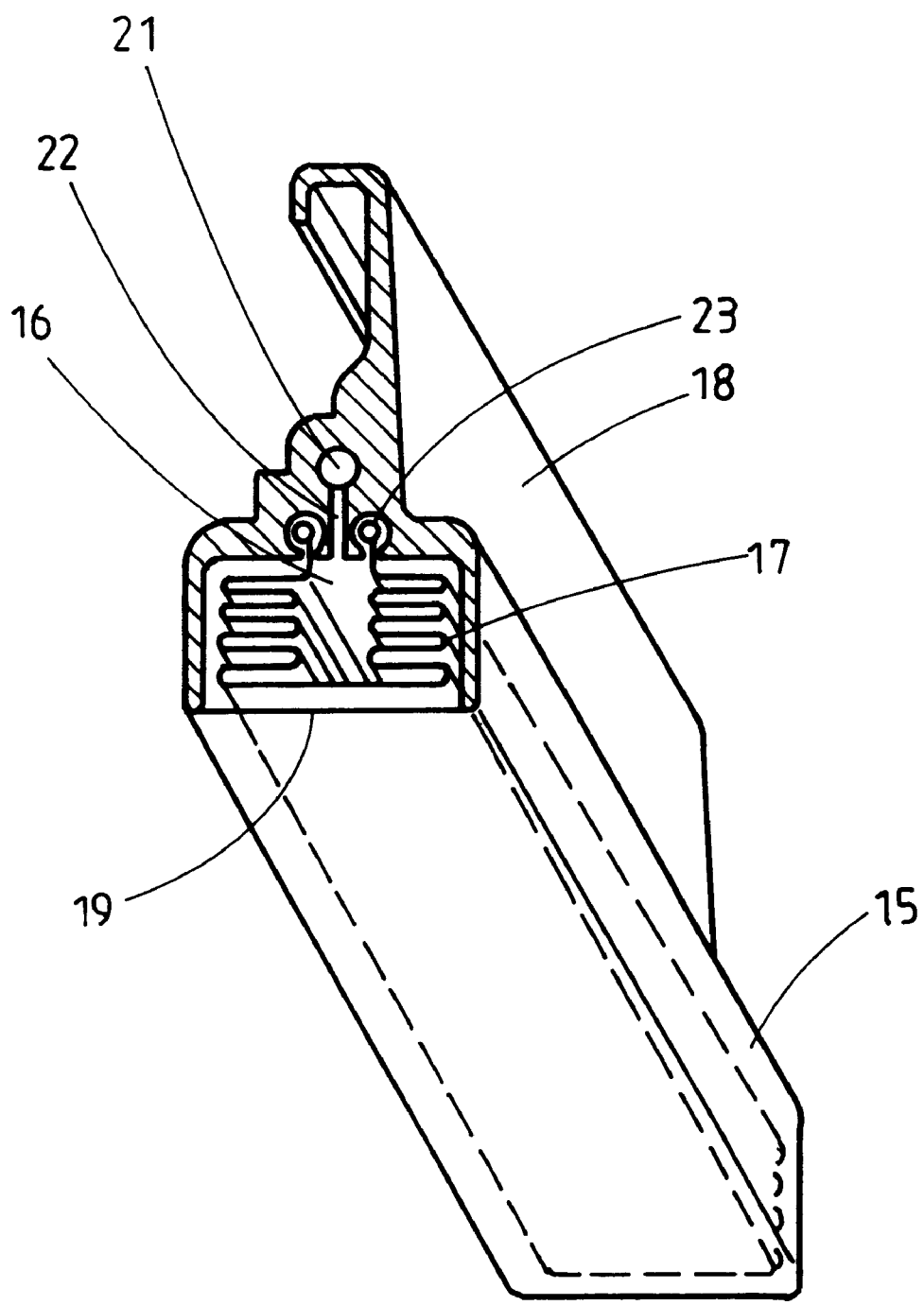
FIG. 3 the profiled rail according to FIG. 2 with stretched out, folded air bag in a sectional representation.

As can be seen clearly in FIG. 3, the through channel 21 is provided in parallel to the extension of the profiled channel 16 within the profiled rail 15 via which gas for inflating the folded air bag 17, produced by a non-represented gas generator, is supplied whereby this through channel 21 is connected by a passage 22 to the profiled channel 16. The profiled channel 16 is substantially U-shaped whereby the air bag 17 is folded into the profiled channel 16 in folds that extends parallel to the bottom of the profiled channel 16. The two outer longitudinal ends of the air bag 17 are fastened on both sides of the passage 22 in undercuts 23 in the bottom of the profiled channel 16 at the profiled rail 15. The undercuts 23 extend in the longitudinal direction of the profiled rail 15 so that the gas exiting from the through channel 21 via the passage 22 will inflate the air bag 17 in the profiled channel 16 and will unfold the air bag 17 out of the profiled rail 15. The unfolding action is very rapid because only parallel extending folds of the air bag 17 must be unfolded. Possible double layers and folded-over portions are avoided by the exclusively stretched folding of the air bag 17.

The present invention is, of course, in no way restricted to the specific disclosure of the specification and drawings, but also encompasses any modifications within the scope of the appended claims.

What is claimed is:

1. A vehicle seat comprising:

a seat frame having a pivot connection (13);

a seat portion (11) mounted on said seat frame and a backrest (12), having a head rest (14), mounted on said seat frame such that said backrest (12) is pivotable relative to said seat portion about said pivot connection (13);

a lateral airbag system mounted in said backrest (12) and extending in a longitudinal direction of said backrest (12);

said lateral airbag system comprising an elongate housing (15) open at one side;

said elongate housing (15) having an elongate channel (16) extending along a side of said backrest (12) to an upper end of said head rest (14);

said elongate housing (15) connected to said seat frame;

said lateral airbag system comprising an airbag (17) folded into said elongate channel (16) such that a direction of folding is perpendicular to a longitudinal direction of said elongate channel (16) and such that said airbag (17) is completely extended out in said longitudinal direction;

a cover (19) covering said open side of said elongate housing (15);

said cover (19) adapted to open upon actuation of said airbag (17) to release said airbag (17).

2. A vehicle seat according to claim 1, wherein said elongate housing (15) has opposed ends in said longitudinal direction that are closed.

3. A vehicle seat according to claim 1, wherein said elongate housing (15) is an integral part of said seat frame.

4. A vehicle seat according to claim 1, wherein said elongate housing (15) projects downwardly past said pivot connection (13).

5. A vehicle seat according to claim 1, wherein said elongate housing (15) has an angled portion extending past said pivot (13) in a direction away from said seat portion (11).

6. A vehicle seat according to claim 1, wherein said lateral air bag system comprises a separate airbag module mounted in said elongate housing (15), wherein said airbag (17) is a part of said separate airbag module.

7. A vehicle seat according to claim 1, wherein said housing (15) comprises a gas inlet slot (22) extending over the length of said elongate housing (15).

8. A vehicle seat according to claim 1, wherein said elongate housing (15) has a plurality of gas inlet openings distributed over the length of said elongate housing (15).

9. A vehicle seat according to claim 1, wherein said cover (19) is an upholstery part of said backrest (12).

* * * * *